United States Patent Office 3,355,385
Patented Nov. 28, 1967

3,355,385
PROCESS FOR REMOVING ORGANIC COATINGS
Charles Joseph Mackley, Philadelphia, Pa., assignor to Pennsalt Chemical Corporation, Philadelphia, Pa., a corporation of Pennsylvania
No Drawing. Filed June 18, 1965, Ser. No. 465,151
4 Claims. (Cl. 252—104)

ABSTRACT OF THE DISCLOSURE

This invention is directed to processes for stripping organic coatings such as paints and resins from metal substrates employing hydrogen peroxide as the bond release agent. The hydrogen peroxide is used in aqueous compositions at concentrations of 0.5 to 45% by weight in combination with one or more organic paint stripping solvents. Thickeners, stabilizers, surfactants, and evaporation retardants are useful additives in the stripping process. The stripping processes of this invention are particularly advantageous where corrosion of the substrate cannot be tolerated.

---

This invention is directed to new paint strippers employing hydrogen peroxide as a paint bond release agent or paint stripper activator.

With the use of fully cross linked epoxy paint systems there has arisen a need for a stripper which will effectively remove epoxies without attacking the various base metals such as steel, aluminum, magnesium, titanium and cadmium plated steel. Paint strippers employing strong acids have proven capable of removing the epoxy paints but they are limited in their use because of the attack on the base metal by the strong acids. Alkaline activated paint removers based on amines, ammonia, and caustic soda have in large measure proved ineffective in removing epoxy or polyurethane coatings.

I have now discovered paint release compositions utilizing aqueous hydrogen peroxide as a paint bond release agent or activator in combination with paint stripping solvents that will effectively release most epoxy and polyurethane coatings as well as typical paints and lacquers without causing corrosion of the metal substrate.

The hydrogen peroxide is generally obtained from 10 percent or 30 percent aqueous solutions. Higher concentration peroxide should be avoided because it may be unstable in the presence of organic materials. Usually there will be small quantities of water used in addition to that added in conjunction with the hydrogen peroxide.

The paint stripping solvents which are used in my paint bond release or paint stripping compositions are one or more of the solvents such as ethylene dichloride, chlorobenzene, methyl alcohol, ethyl alcohol, propyl alcohol, isopropyl alcohol, butyl alcohol, isobutyl alcohol, dichlorobenzenes, perchloroethylene, toluene, xylene, methylene chloride, phenols, 2-nitropropane, trichloropropanes, mono and dialkyl benzenes in which the alkyl groups may contain $C_2$ and $C_3$ carbon atoms, cresols, naphthols and xylenols. Benzene, carbon tetrachloride and chloroform are excellent paint stripping solvents but special precautions must be taken in their use because of their toxicity. The ketones such as acetone, methylethyl ketone, pyrrolidone, alkylpyrrolidones in which the alkyl radical may be methyl and ethyl are also useful in my compositions. However, conditions of use such as high peroxide concentration and high temperatures must be avoided which would cause excessive oxidation of the ketones. Mixtures of the above are also useful in my compositions.

The above constituents must be present in amounts or concentrations which will be effective in releasing the paint or resin film from the metal substrate. Generally, the effective amount of the constituents which are utilized will be within the range of concentrations set forth below.

The minimum amount of hydrogen peroxide which is effective is 0.5% of the 100% material. Concentrations as high as 45% by weight have been found useful but higher amounts have not provided any additional paint bond release characteristics. A preferred concentration is about 5% by weight of the active material. Hydrogen peroxide at 10% by weight concentration may be used for minimum additions of peroxide. However, if the maximum amount of peroxide is desired the 10% peroxide material may contain too much water for my compositions and 30% or higher by weight peroxide is used.

The minimum amount of paint stripping solvent which I require in my paint strippers is about 10% by weight. Concentrations as high as 99% have proven effective. Preferably the paint stripping solvent will be present at about 55% by weight.

Water will be present at least to the extent of 0.5% by weight and can be as high as 89.5% by weight particularly when functioning in part as an evaporation retardant. Preferably the water will be around 20% by weight.

Generally the time required for stripping the resin or paint bond is proportional to the amount of paint stripping solvent present. The greater the quantity of paint stripping solvent present the less time will be required to remove the organic coating.

A preferred composition which will successfully raise an epoxy or polyurethane coating from a metal substrate comprises hydrogen peroxide, 5.0%; water, 22%; phenol, 16%; and ethylene dichloride, 57%; the concentrations being expressed as percent by weight.

Since some of the above compositions may form immiscible layers, it may be desirable to emulsify them by mechanical agitation. High-shear stirring, particularly homogenization, is often used.

The above compositions are effective in raising the resin or paint bond from the metal substrate and thereafter the loosened film can be removed from the metal substrate by brushing, wiping, or scraping. Another effective way is to subject the treated metal to a water stream containing an organic surfactant to assist in removing the loosened paint or resin.

Advantageously, the paint release compositions will have incorporated in them one or more organic surfactants to assist in the removal of the loosened paint films. The organic surfactants particularly useful for this purpose are either liquid or solid nonionic, cationic, anionic or amphoteric types. The purpose of the surfactant is to secure stable emulsification of insoluble or immiscible solids or liquids and good rinsing from the metal substrate. Mixtures of the various detergents to obtain emulsification, cleaning, rinsing, solubilizing, dispersion, penetration and wetting action are particularly useful.

The minimum quantity of organic surfactant required to assist in the removal of the loosened resins and paint by water rinsing varies widely with the type and efficiency of the detergent used. Highly efficient detergents have been used at concentrations as low as 0.01% by weight. Less efficient detergents are used at concentrations no lower than 0.5% by weight. Amounts as high as 2% by weight are effective. Larger amounts, of course, may be used without providing any additional benefits. Preferably I use about 2% of the organic surfactants in my compositions.

Suitable anionics are alkylaryl sulfonates in which the alkyl substituent varies from $C_8$ through $C_{18}$ carbon atoms and in which the aryl substituent may be phenyl or naphthyl, such as dodecylbenzene sodium sulfonate manufactured under the trademark Santomerse; sodium alkyl sulfates in which the alkyl substituents may vary from $C_8$ through $C_{18}$ carbon atoms such as sodium lauryl sulfate manufactured under the trademark Duponol P. C.; alkyl sulfonates in which the alkyl substituent may vary from $C_8$ through $C_{18}$ carbon atoms such as sodium dodecyl sulfonate manufactured under the trademark MP–189; aryl sulfonates in which the aryl substituents may be phenyl or naphthyl such as sodium tetrahydronaphthalene sulfonate sold under the trademark Alkanol S; alkali metal salts of fatty acids having a carbon content of $C_8$ through $C_{18}$ carbon atoms such as sodium stearate; and alkali metal lignosulfonates such as Polyfons.

Nonionics suitable for use in my paint release compositions include alkylphenyl-ethylene oxide condensates in which the alkyl substituent may vary from $C_8$ through $C_{18}$ carbon atoms and the number of moles of condensed ethylene oxide units varies from 1 to 100 per mole of alkyl such as isooctylphenyl polyethoxy ethanol sold under the trademark Triton X 100 or dodecylphenyl polyethylene glycol ether sold under the trademark Tergitol 12 P 12; polyoxyethylene thioethers such as STEROX SK; propylene oxide-ethylene oxide condensates such as Pluronics described in U.S. Patent 2,674,619; fatty acid alkanolamides in which the fatty acid constituent may vary from $C_8$ through $C_{18}$ carbon atoms, such as lauric acid alkanolamide; alkyl poly-(ethyleneoxy) ethanols in which the alkyl radical may vary from $C_8$ through $C_{18}$ carbon atoms and the moles of condensed ethylene oxide may vary from 1 to 100 per mole of alkyl such as tridecyloxy poly (ethyleneoxy) ethanol sold as Emulphogene BC–840, or the ethylene oxide condensate of stearyl alcohol containing about ten moles of ethylene oxide per stearyl mole; and the polyhydroxyalkyl fatty acid esters such as glycerol monooleate or sorbitan stearate.

The cationic detergents useful in my paint bond release compositions include the straight chain alkyl fatty amines in which the alkyl group varies from 8 to 18 carbon atoms such as di-coco amine sold under the trademark Hormonyte 701; the N-alkyltrimethylene diamines in which the alkyl group varies from 8 to 18 carbon atoms such as N-lauryl trimethylene diamine. The higher alkyl pyridinium halides in which the alkyl group varies from 8 to 18 carbon atoms such as cetylpyridinium bromide sold under the trademark Fixanol C; the quaternary ammonium salts such as monoalkyl and dialkyl methyl quaternary ammonium salts in which the alkyl substituents range from $C_8$ to $C_{18}$ carbon atoms such as monococotrimethyl quaternary ammonium chloride and the didodecyldimethyl quaternary ammonium chloride; the quaternary salts in which the cationic is based on phosphorous, such as stearamide propyldimethyl-B-hydroxyethyl ammonium dihydrogen phosphate sold under the name Catanac S.P.; the fatty acyl derivatives of hydroxylated diamines such as N-(amino-ethyl) ethanolamine as described in U.S. Patent 2,340,881, or the quaternary derivatives obtained by adding an excess of methyl or ethyl sulfate as disclosed in U.S. 2,329,406; the C-alkyl pyridines in which the alkyl group may vary from $C_8$ to $C_{18}$ carbon atoms as described in U.S. 2,247,266; the alkyl substituted 2,3-dihydroindoles in which the alkyl substituent is within the range of $C_8$ to $C_{18}$ carbon atoms, preferably in the range of $C_{10}$ to $C_{16}$ carbon atoms; the 2-alkyl benzimidazoles in which the alkyl substituents are within the range of $C_8$ to $C_{18}$ carbon atoms and also their quaternary salts; and the 2-alkyl quinolines in which the alkyl substituent is within the range of $C_8$ to $C_{18}$ carbon atoms including the quaternary salts as described in French Patent 781,812.

Among the amphoterics useful in my paint bond compositions are the alkali metal salts of N-cocoaminobutyric acid such as sodium or potassium cocoaminobutyric acid, cetylpalmiticalkanolamides in which the alkyl groups vary from $C_8$ to $C_{18}$ carbon atoms, the natural lecithins such as those sold under the trade name Centrol, N-cocobetaaminopropionic acid, the polyethoxy amino acid salts in which the condensed ethoxy group may vary from 1 to 100, such as the product sold under the trade name Merse and tallow amido ammonium acid betaine.

A paint release composition useful in the process of this invention comprises the following constituents expressed as percent by weight:

| | |
|---|---|
| Hydrogen peroxide | 7.0 |
| Water | 23.0 |
| Methylene chloride | 52.5 |
| Organic surfactant | 1.0 |
| Scale wax | 1.5 |
| Methylcellulose | 1.0 |
| Phenol | 14.0 |

When painted surfaces are large in area or are structural parts of large areas such that immersion of the part in a tank for stripping is impractical, paint stripping practice requires the use of a thickened material which, when sprayed on a vertical surface will remain for a sufficient time to loosen the epoxy or other paint coating. Suitable thickeners are ethyl cellulose, ethylhydroxyethyl cellulose, methyl cellulose and other modified celluloses, colloidal silica, copolymers of acrylic acid and about 1% by weight of a polyallyl ether of sucrose having an average of 5.8 allyl groups per sucrose molecule sold under the trade name Carbopol 934, colloidal alumina, bentonite, gum arabic, starch, tragacanth, agar and Polyox, polyethyleneoxide having molecular weight within the range of 100,000 to 10,000,000, and similar materials. I have found it desirable to have at least 0.1% by weight of a thickener present when it is employed. A concentration of about 1% is most often used and is preferred. Concentrations as high as 15% have been used.

For tank applications wherein a thickener is not required, it is desirable to have an evaporation retardant present to prevent excessive volatilization of the solvents. The evaporation retardants useful for spraying are also suitable for tank immersion stripping. A particularly useful retardant for this application is a water seal which rests on top of the paint stripper. Suitable evaporation retardants are paraffinic wax and water. When I use an evaporation retardant, I find that I require at least 0.5% by weight of the composition. Preferably the concentration of the retardant will be about 1.5% by weight. When a water seal is used considerably higher amounts may be used, particularly in immersion tank applications where the water may be two or three times the amount of paint release material.

In the tank applications of my stripping compositions the coated article is immersed in the paint stripper for sufficient time to loosen the organic coating. Generally this time will vary from one-half minute to several hours depending on the resistance of the coating and the freshness of the paint stripping composition. For particularly resistant pieces it has been occasionally necessary to leave the part immersed overnight. After the paint bond has been sufficiently loosened from the substrate, the article is removed from the paint stripper and is then subjected to a water spray to remove the loosened coating. Brushing or other mechanical removal of the loosened coating may be desirable.

The temperature in the stripping tank will vary from room temperature up to a temperature which approaches the boiling point of the composition. Generally the higher the temperature the more effective is the paint stripping action and a minimum time for immersion is obtained. However, boiling temperatures or temperatures near boiling cannot be used because of the excessive loss of volatile materials. A temperature of about 160° F. is preferred. Ambient temperatures are often used.

When my paint stripping compositions are sprayed on articles to be stripped, a temperature somewhat lower than that used in the immersion tanks is used in order to cut down evaporation losses. For spraying, generally a temperature in the range of from room temperature to 140° F. is used.

It is desirable to use stainless steel for pumps, immersion tanks and spray guns for these paint stripping compositions. Polyethylene lined drums or pails are used for shipping. For safety reasons shipping containers are vented by automatically venting spouts or bungs.

The paint stripping compositions are prepared by placing the paint stripping solvent in a clean open tank made of stainless steel or glass and equipped with a stirrer. If an organic detergent is to be used it is then added to the paint stripping solvent while agitating it. If the paint stripping composition is to be used for spraying or brushing, a thickener is then added to the above solution while it is being stirred. If wax is to be used as an evaporation retardant in the composition, this is added next so that it dissolves in the solvent. It may be necessary to warm the solution moderately to assist in the dissolution of the wax. The water and hydrogen peroxide are mixed in a separate container so as to dilute the hydrogen peroxide and thereafter it is added slowly to the above materials while it is stirring.

The best method of practicing my invention will be apparent from the consideration of the following examples. All parts, unless otherwise indicated, are given in percent by weight.

Example 1

Alodined aluminum was first coated with a primer to a thickness of 0.8 mil and thereafter coated with an epoxy paint to a thickness of 1.4 mils (total thickness 2.2 mils) with Super Koropon. Strips of the epoxy coated aluminum were sprayed with the following composition at room temperature:

| | Percent wt. |
|---|---|
| Methylene chloride | 74 |
| Phenol | 8 |
| Hydrogen peroxide | 3 |
| Nonylphenol ethylene oxide | 2 |
| Scale wax | 2 |
| Thickener (Methocel 65 HG 4000) | 1 |
| Water | 10 |

After being allowed to stand for thirty minutes, the coated aluminum strips were rinsed with a water spray. The epoxy coating was completely removed from the aluminum strips. The same epoxy coated aluminum strips were immersed in acid and alkaline paint strippers of essentially the same composition but without hydrogen peroxide and very little attack on the coating was obtained after five hours.

Example 2

Aluminum panels coated in the same manner as described in Example 1 were immersed in the following composition:

| | Percent wt. |
|---|---|
| Toluene | 5 |
| Methylene chloride | 45 |
| Phenol | 15 |
| Hydrogen peroxide | 5 |
| Nonylphenol ethylene oxide | 2 |
| Scale wax (Atlantic 342) | 2 |
| Water | 26 |

After immersion in the paint stripping composition for thirty minutes at a temperature of 140° F., the panels were removed and rinsed in a water spray. All of the epoxy coating was removed by this treatment.

Example 3

Steel panels coated with a polyurethane coating were sprayed with the following composition:

| | Percent wt. |
|---|---|
| Paint stripping solvent (methylene chloride) | 30 |
| o-Dichlorobenzene | 25 |
| Xylenol | 14 |
| Hydrogen peroxide | 4.5 |
| Evaporation retardant (scale wax Esso Ovalon 25) | 1.4 |
| Thickener (colloidal silica) | 2 |
| Water | 22 |
| Organic surfactants-sodium dodecylsulfonate 1 part and glycerol monooleate 1 part | 2 |

The treated panels were left standing with the paint stripping composition on them for 30 minutes and then rinsed with a water spray. All of the coating was removed by the treatment.

Example 4

A mixture consisting of hydrogen peroxide 27%, phenol 10%, and water 63% completely stripped Super Koropon paint (0.8 mil primer and 1.4 mils topcoat) from Alodined aluminum after 1 hour immersion time at room temperature.

Example 5

A mixture consisting of methylene chloride 61%, hydrogen peroxide 3%, methyl alcohol 21%, water 7%, natural lecithin-Centrol 2P 5% and scale wax 3% stripped an epoxy coated panel after 25 minutes in contact at room temperature.

Example 6

A mixture of hydrogen peroxide 0.5%, water 56.5%, meta, paracresol 30%, methylethylketone 10% and sulfonated castor oil 3% loosened an epoxy film sufficiently from anodized aluminum to be flushed away with a pressure water rinse after 15 minutes immersion time at 140° F.

Example 7

A mixture of hydrogen peroxide 10%, 2 nitropropane 10%, ethylene dichloride 56%, water 20%, methyl alcohol 3% and ethyl hydroxyethyl cellulose 1% attacked a polyurethane film on steel after 15 minutes at room temperature to permit film removal by scraping.

Example 8

A composition comprising meta, para-cresol 15%, methylene chloride 68.5%, benzene 15%, water 1% and hydrogen peroxide 0.5% at room temperature softened a Brown epoxy paint film on bare aluminum enough to be brushed off in 15 minutes.

Example 9

A mixture of phenol 10%, hydrogen peroxide 0.5% and water 89.5% at 110° F. softened an epoxy film sufficiently to permit removal by scraping after 15 minutes.

Example 10

A magnesium panel was coated by immersion in a dichromate solution and covered with a epoxy primer. The primer was removed with a water flush after 25 minutes when sprayed with the following composition:

| | Percent |
|---|---|
| Ethylene dichloride | 45 |
| Carbon tetrachloride | 10 |
| Hydrogen peroxide | 8 |
| Water | 12 |
| Colloidal silica | 20 |
| Igepol CO 430 (nonyl) phenoxypolyethyleneoxyethanol) | 5 |

Example 11

An epoxy paint was removed from a sulfuric acid anodized aluminum panel with brushing after 10 seconds immersion and 15 minutes vertical drain off with the following composition:

| | Percent |
|---|---|
| Methylene chloride | 53.9 |
| N-methylpyrrolidone | 12 |
| Phenol | 15 |
| Hydrogen peroxide | 4 |
| Water | 10 |
| Scale wax | 5 |
| Ucar polyox coagulent (approximately 3000 molecular weight polyethyleneoxide) | 0.1 |

Example 12

A mixture comprising methylene chloride 87.49%, water 8%, hydrogen peroxide 4%, cationic surfactant

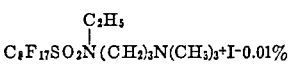

and scale wax (Atlantic #342) 0.5% softened polyurethane film sufficiently in 15 minutes to be removed from bare aluminum by brushing.

Example 13

The following composition:

| | Percent |
|---|---|
| Hydrogen peroxide | 44.7 |
| Water | 19.3 |
| Sodium dodecylbenzenesulfonate | 5.0 |
| 1,2,3 trichloropropane | 7.0 |
| Phenol | 10.0 |
| Bentonite | 14.0 | was used to remove Super Koropon green primer from a vertical Alodined aluminum surface. The coating was removed within 20 minutes after application by brushing.

Example 14

A paint bond release composition comprising perchloroethylene 60%, phenol 15%, hydrogen peroxide 7%, water 10%, polyox 3%, colloidal silica 4% and N-cocobetaaminopropionic acid 1% removed a 2 mil coating of Duracron 200 from stainless steel.

Example 15

A mixture of methylene chloride 55.4%, napthol 10%, water 15%, Merse (polyethoxyamino acid salt) 3%, carbopol 934 0.1%, triamylamine 0.5%, hydrogen peroxide 4%, water 10%, Esso scale wax #25 1% removed a 3 mil coating of A. Brown epoxy from a vertical untreated aluminum surface.

Example 16

A mixture of methylene chloride 64.2%, cationic surfactant—Fixanol C—0.5%, Methocel methyl cellulose—65HG4000—0.8%, scale wax 1.5%, hydrogen peroxide 0.9%, water 2.1%, and phenol 30% lifted an unbaked Super Koropon epoxy yellow primer (0.5 mil thick) and gray topcoat (1.5 mil) from Alodined aluminum within one hour at room temperature.

Example 17

An unbaked epoxy paint system of 2 mil total thickness was removed from bare magnesium by immersion in the following: monochlorobenzene 30%, phenol 25%, water 40%, hydrogen peroxide 2%, cationic surfactant stearamido-propyldi-methyl-B-hydroxyethyl ammonium phosphate (Catanac SP) 3% within 1 hour at 120° F.

What is claimed is:

1. The process of removing an organic coating from a substrate without corroding the substrate by contacting the organic coating for a time sufficient to release the organic with a coating a stripping composition in which the principal ingredients consist essentially of hydrogen peroxides, water and at least one organic paint stripping solvent, said hydrogen peroxide and organic paint stripping solvents being present at concentrations effective in releasing the organic coating from the substrate, and thereafter, removing the said stripping composition and released organic coating from the substrate.

2. The process of claim 1 in which the principal ingredients of the stripping composition, expressed as percent by weight, consist essentially of the following:

| | |
|---|---|
| Hydrogen peroxide | 0.5 to 45 |
| Water | 0.5 to 89.5 | and at least one organic paint stripping solvent 10 to 99.

3. The process of claim 2 in which there is added effective concentrations of surfactants, thickeners and evaporation retardants to the stripping composition.

4. The process of removing an organic coating from a substrate by contacting the organic coating for a time sufficient to release the organic coating with a stripping composition, expressed as percent by weight, consisting essentially of

| | |
|---|---|
| Hydrogen peroxide | 7.0 |
| Water | 23.0 |
| Methylene chloride | 52.5 |
| Organic surfactant | 1.0 |
| Scale wax | 1.5 |
| Methyl cellulose | 1.0 |
| Phenol | 14.0 |

References Cited
UNITED STATES PATENTS

| | | | |
|---|---|---|---|
| 2,242,106 | 5/1941 | Buckman | 134—8 |
| 2,886,532 | 5/1959 | Richmond et al. | 252—104 |
| 3,060,126 | 10/1962 | Girard et al. | 252—159 |
| 3,138,557 | 6/1964 | Arden et al. | 252—136 |
| 3,168,477 | 2/1965 | Swanson et al. | 134—38 XR |
| 3,179,609 | 4/1965 | Morisson | 134—38 XR |
| 3,189,553 | 6/1965 | Lange | 134—38 |

LEON D. ROSDOL, *Primary Examiner.*

M. WEINBLATT, *Assistant Examiner.*

UNITED STATES PATENT OFFICE
CERTIFICATE OF CORRECTION

Patent No. 3,355,385  November 28, 1967

Charles Joseph Mackley

It is hereby certified that error appears in the above numbered patent requiring correction and that the said Letters Patent should read as corrected below.

Column 3, line 48, for "Hormonyte" read -- Formonyte --; column 8, lines 15 and 16, for "organic with coating" read -- organic coating with --.

Signed and sealed this 17th day of December 1968.

(SEAL)
Attest:

Edward M. Fletcher, Jr.

Attesting Officer

EDWARD J. BRENNER

Commissioner of Patents